(12) United States Patent
Peuziat et al.

(10) Patent No.: US 7,949,332 B2
(45) Date of Patent: May 24, 2011

(54) FEATURE SHARING

(75) Inventors: Xavier Peuziat, Grenoble (FR); Gilbert Clauzel, Grenoble (FR); Galina Guyot, Grenoble (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 827 days.

(21) Appl. No.: 11/491,842

(22) Filed: Jul. 24, 2006

(65) Prior Publication Data

US 2007/0072597 A1 Mar. 29, 2007

(30) Foreign Application Priority Data

Sep. 27, 2005 (EP) .................................... 05300780

(51) Int. Cl.
*H04M 3/00* (2006.01)

(52) U.S. Cl. ........................................ 455/420; 418/419

(58) Field of Classification Search ........... 455/415–423
See application file for complete search history.

(56) References Cited

U.S. PATENT DOCUMENTS

| 6,195,694 B1* | 2/2001 | Chen et al. .................... 709/220 |
| 7,100,166 B2* | 8/2006 | Takatama et al. ............. 719/318 |
| 2003/0078036 A1* | 4/2003 | Chang et al. ................... 455/419 |
| 2004/0082346 A1* | 4/2004 | Skytt et al. .................. 455/456.3 |
| 2004/0087273 A1* | 5/2004 | Perttila et al. ................. 455/41.2 |
| 2004/0209595 A1* | 10/2004 | Bekanich ....................... 455/405 |
| 2005/0170775 A1* | 8/2005 | Rose ............................ 455/41.2 |
| 2005/0231588 A1* | 10/2005 | Yang et al. .................. 348/14.08 |
| 2005/0273780 A1* | 12/2005 | Torvinen ....................... 717/171 |
| 2007/0004387 A1* | 1/2007 | Gadamsetty et al. ......... 455/41.2 |
| 2007/0156597 A1* | 7/2007 | Sako et al. ...................... 705/51 |
| 2007/0283420 A1* | 12/2007 | Rantalahti ......................... 726/4 |

OTHER PUBLICATIONS

Bluetooth Sig: "Specification of the Bluetooth System, Part E, Service Discovery Protocol (SDP)" Bluetooth Specs. Dec. 1, 1999, pp. 325-384 (XP002245657).

* cited by examiner

*Primary Examiner* — Dai A Phuong

(57) ABSTRACT

According to one aspect of the present invention, there is provided a mobile telephone operable to use a feature of a second mobile telephone comprising a share module for obtaining details of one or more features on the second mobile telephone which are available for use by the mobile telephone a user interface for selecting an available feature; and a communication module for communicating data with the second mobile telephone to enable the selected feature to be used by the mobile telephone.

17 Claims, 3 Drawing Sheets

FIGURE 2
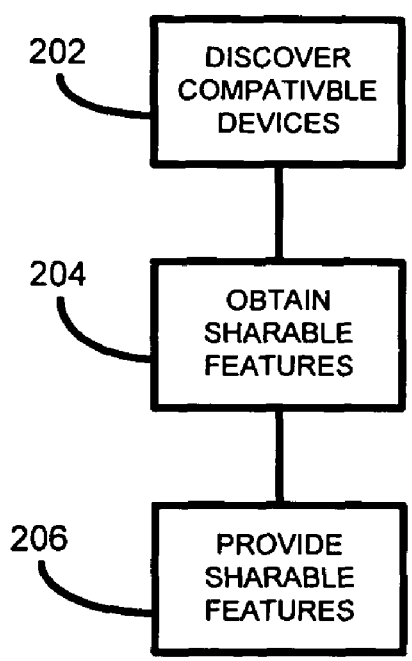
FIGURE 3
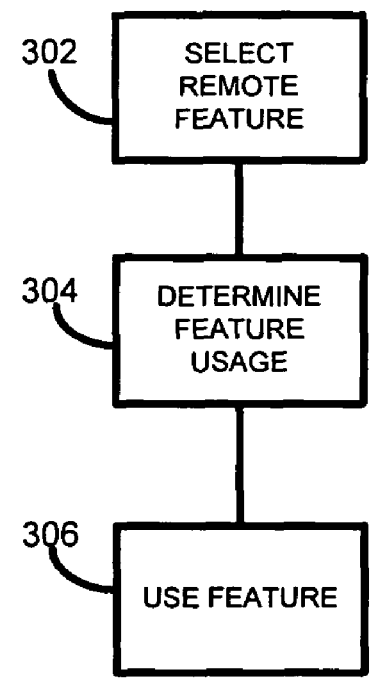
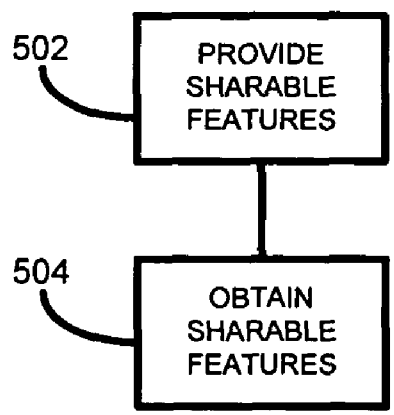
FIGURE 5

FEATURE SHARING

FIELD OF THE INVENTION

The present invention relates generally to feature sharing and particularly, but not exclusively, to feature sharing between communication terminals.

BACKGROUND OF THE INVENTION

The use of mobile telephones is now widespread, with hundreds of millions of mobile telephones being in operation around the world.

The majority of current mobile telephones each provide a set of features, functionality and services, such as the ability to make and receive calls over a mobile telephone network, the ability to send and receive SMS messages, provision of electronic address books, and the like. Such features are generally found on the majority of mobile telephones.

In addition to these basic features, additional advanced features such as high-speed data access, digital cameras, videoconferencing, and the like, are found on many modern mobile telephones.

However, although a mobile telephone may have a given set of features, it may be desirable for the owner of the mobile telephone to access additional features, functionality or services which are not available on their mobile telephone. For example, a user may wish to send a multimedia message system (MMS) message but is unable to if their mobile telephone does not support access to a high-speed data network, such as GPRS. A similar situation arises where a user's phone does support GPRS but the user's subscription with the network provider does not enable GPRS access.

Similarly, a user may wish to take a digital photograph using his mobile telephone, but is unable to if his mobile telephone does not have a built-in digital camera.

Currently, the only way for users to access features, functionality or services which are not available on their mobile telephones is for the user to obtain a mobile telephone with those desired features or to upgrade their network subscription to include those missing features. However, a user may be either unable or willing to do so, due for example to the cost of purchasing a new mobile telephone or of upgrading a subscription level. At present no other alternatives are known.

Accordingly, one aspect of the present invention aims to overcome, or at least alleviate, at least some of the above-mentioned problems.

SUMMARY OF THE INVENTION

According to a first aspect of the present invention, there is provided a mobile telephone operable to use a feature of a second mobile telephone. The mobile telephone comprises a share module for obtaining details of one or more features on the second mobile telephone which are available for use by the mobile telephone, a user interface for selecting an available feature, and a communication module for communicating data with the second mobile telephone to enable the selected feature to be used by the mobile telephone.

Advantageously a user of a mobile telephone can use a feature or features on a remote mobile telephone as if that feature were available directly on the user's mobile telephone. In this way, a user is able to enhance the functionality of his mobile telephone without having to upgrade or change his mobile telephone.

Suitably, the share module is adapted for providing to the second mobile telephone details of one or more features on the mobile telephone which are available for use by the second mobile telephone.

Suitably, the share module is further adapted to obtain, for each available feature, usage information indicating the how to use that feature.

Suitable, the communication module is arranged to communicate data with the second mobile telephone in accordance with the obtained usage information relating to the selected feature.

Suitably, the communication module is arranged to communicate with the second mobile telephone over a local wireless communication link, and further the share module is arranged to obtain the details over the local wireless communication link.

Suitably, the communication module is arranged to communicate with the second mobile telephone via a share coordination module accessible via a mobile data network.

Suitably, the user interface is adapted to offer a service, the service requiring one or more functions at least one of which is not available on the mobile telephone, the share module being arranged to determine when the required features are available on the second mobile telephone, and to enable use of the service on the mobile telephone when it is determined that the required features are available on the second mobile telephone.

Suitably, the share module is arranged to obtain pricing information relating to the one or more features.

According to a second aspect of the present invention, there is provided a method of a using, from a first mobile telephone, a function available on a second mobile telephone. The method comprises obtaining details of one or more features on the second mobile telephone which are available for use by the first mobile telephone, selecting an available feature, and communicating data with the second mobile telephone to enable the first mobile telephone to use the selected feature on the second mobile telephone.

According to a third aspect of the present invention, there is provided apparatus for enabling a first mobile telephone to use a feature of a second mobile telephone. The apparatus comprises a share module for communicating with the second mobile telephone to obtain details of one or more features on the second mobile telephone which are available for use by the mobile telephone. The share module is further operable to communicate data between the first and second mobile telephone to enable a feature of the second mobile telephone to be used by the first mobile telephone.

According to a fourth aspect of the present invention, there is provided a method of providing a service on a mobile telephone, the service requiring one or more functions, at least one of which is not available on the mobile telephone. The method comprises determining the non-available functions, identifying one or more other mobile telephones which are operable to provide access to the one or more lacking functions and communicating with the one or more identified mobile telephones to appropriately use the determined functions to thereby provide the service on the mobile telephone.

BRIEF DESCRIPTION OF THE DRAWINGS

Embodiments will now be described, by way of non-limiting example only, with reference to the accompanying drawings, in which:

FIG. 2 is a flow diagram showing example processing steps taken by a mobile telephone according to a first embodiment of the present invention;

FIG. 3 is a flow diagram showing example processing steps taken by a mobile telephone according to a first embodiment of the present invention;

FIG. 5 is a flow diagram showing example processing steps taken by a mobile telephone according to a second embodiment of the present invention.

DETAILED DESCRIPTION

Figure 1:
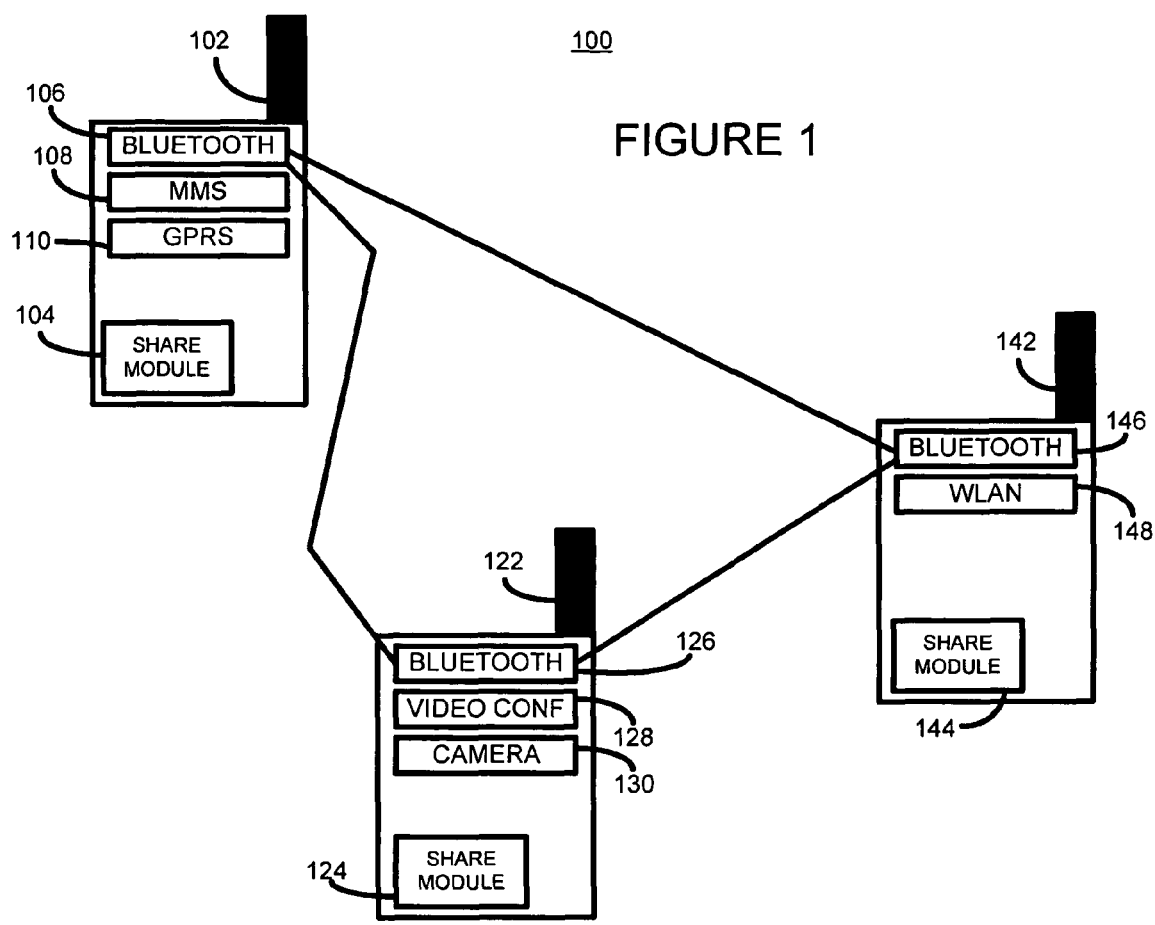
FIG. 1 is a block diagram, showing an overview of a system 100 according to a first embodiment of the present invention.

Referring now to FIG. 1, there is shown a block diagram showing an overview of a system 100 according to an embodiment of the present invention. FIG. 1 shows a number of mobile telephones 102, 122 and 142. Each of the mobile telephones 102, 122 and 142 have a number of basic features, such as a GSM module giving the ability to make and receive telephone calls over a mobile telephone network, a user interface module for allowing a user to operate the phone, and so on. For clarity, these features are not illustrated.

In addition to the basic features, each of the mobile telephones 102, 122 and 142 has a set of additional features. For example, mobile telephone 102 has a Bluetooth communication module 106, an MMS module 108 and a GPRS module 110. Mobile telephone 122 has a Bluetooth communication module 126, a video conferencing module 128, and a digital camera 130. Mobile telephone 142 has a Bluetooth communication module 146, and a wireless networking (WLAN) module 148.

In addition thereto, each mobile telephone 102, 122 and 142 has a respective share module 104, 124 and 144.

The share modules 104, 124 and 144 enable each of the mobile telephones 102, 122 and 142 to share one or more features of any of the other mobile telephones in a simple manner, thereby enabling the owner of one mobile telephone to use a particular feature of another mobile telephone, as if that feature was available directly on his mobile telephone, as will be described in more detail below with reference to FIGS. 2 and 3. The share module enables both the sharing of basic and advanced features.

In the present embodiment each of the mobile telephones 102, 122 and 142 have a Bluetooth communication module. As is well known in the art, Bluetooth is a short-range radio communication technology that enables the discovery and interconnection of other Bluetooth compatible devices. The share module of each mobile telephone uses its respective Bluetooth communication module to periodically determine whether there are any compatible feature sharing enabled mobile telephones within range thereof (step 202). If a share module determines that a compatible mobile telephone is within range, the share module then obtains (step 204) details of any sharable features. The share module also provides (step 206) or publishes details of any features which it is configured to share with any compatible mobile telephones within range.

For example, with reference to FIG. 1, the share module 104 of the mobile telephone 102 communicates, via the Bluetooth communication module 106, with the share modules 124 and 144 of mobile telephones 122 and 142. The share module 104 determines that the mobile telephone 122 has a sharable video conference feature 128, and a digital camera 130. The share module 104 also determines that the mobile telephone 142 has a sharable wireless LAN module 148. The share module 104 also informs the share modules 124 and 144 that the mobile telephone 102 has a sharable MMS module 108 and a GPRS module 110. In this way, each of the compatible mobile telephones within range of one another obtains details of the available sharable features of each other.

Preferably the user of a mobile telephone can select which features, if any, they are wiling to be shared. Additionally the user may determine which other users are allowed to share such features, and which users are blocked from sharing such features. For example, the share module may be configured by the user to only allow access to available shareable features to selected trusted parties, for example friends or colleagues of the user.

A list of sharable features determined by the share module of each mobile telephone is presented to the user of the respective mobile telephones in any suitable manner, for example through a suitable user interface.

For example, the user of the mobile telephone 142 may be presented with a list indicating that the sharable features available are:

MMS;
GPRS;
VIDEO CONFERENCING; and
CAMERA.

Similarly, the user of the mobile telephone 102 may be presented with a list indicating that the sharable features available to him are:

VIDEO CONFERENCING;
CAMERA; and
WIRELESS LAN.

In the following example the user of the mobile telephone 142 desires to send an MMS message via GPRS to a different mobile telephone (not shown). The MMS message to be sent is a text message and an audio recording of the user. For example, the MMS message may contain the text "Happy Birthday Mum", and be accompanied by an audio recording of the user singing 'Happy Birthday'.

Although the mobile telephone 142 does not have an MMS module, the user of the mobile telephone 142 is able to send an MMS message by using the MMS feature of the mobile telephone 108. For example, using an appropriate user interface, the user of the mobile telephone 142 selects (step 302), via the share module 144 the option 'Send MMS'. The share module 144 interrogates (step 304) the share module 102 of mobile telephone providing access to the MMS feature, in this case the mobile telephone 102, to determine the way in which the MMS feature is to be used. Those skilled in the art will appreciate, however, that this step could also be taken during the sharable feature discovery phase. It should be noted that the user of a mobile telephone does not necessarily know the identity of the mobile phone having a sharable feature.

The share module 144 obtains from the share module 102 the required usage of the feature being shared. For example, when sharing an MMS feature the share module 102 may obtain the required format for the MMS message to be sent. For example, the share module 102 may define the format of an MMS message as comprising one or more of four optional elements—namely a text message, an audio file, a graphic file, and a video file.

The share module 144 guides (step 306) the user, in any appropriate manner, through creating an MMS message complying with the determined feature usage details obtained in step 304. For example, the share module may first ask the user to enter a destination address for the message, then to create an optional text message, then to create an optional audio recording, and then to create of attach an optional graphic or video file.

The share module 144 communicates with the share module 104 the data required to enable the mobile telephone 102 to create and send an MMS message. The data could, for example, be communicated as the data is obtained or, alternatively, the mobile telephone 142 could send all of the required data to the share module 104 once all of the required data has been obtained. In the present embodiment the data is communicated over a Bluetooth connection, through the Bluetooth modules 146 and 106.

Once all of the data has been received by the share module 104 the created MMS message is sent to an MMS centre the address of which is configured in the mobile telephone 102, to cause the transmission of the created MMS message to the intended destination.

Since the mobile telephone 142 does not have a digital camera built-in, the user of the mobile telephone 142 could, through use of the share module 144, have additionally used the digital camera of the mobile telephone 122 to take a digital photograph and to have the photograph transferred directly to the mobile telephone 142 for inclusion in the created MMS message. Since the current Bluetooth range is generally limited to several metres the user of the mobile telephone 142 is likely to be within talking distance of the user of the mobile telephone 122 and thus can easily direct the user of the mobile telephone 122 to take the desired photograph.

In this way the user of the mobile telephone 142 may use a feature or service which is not natively available on his phone.

Figure 4:
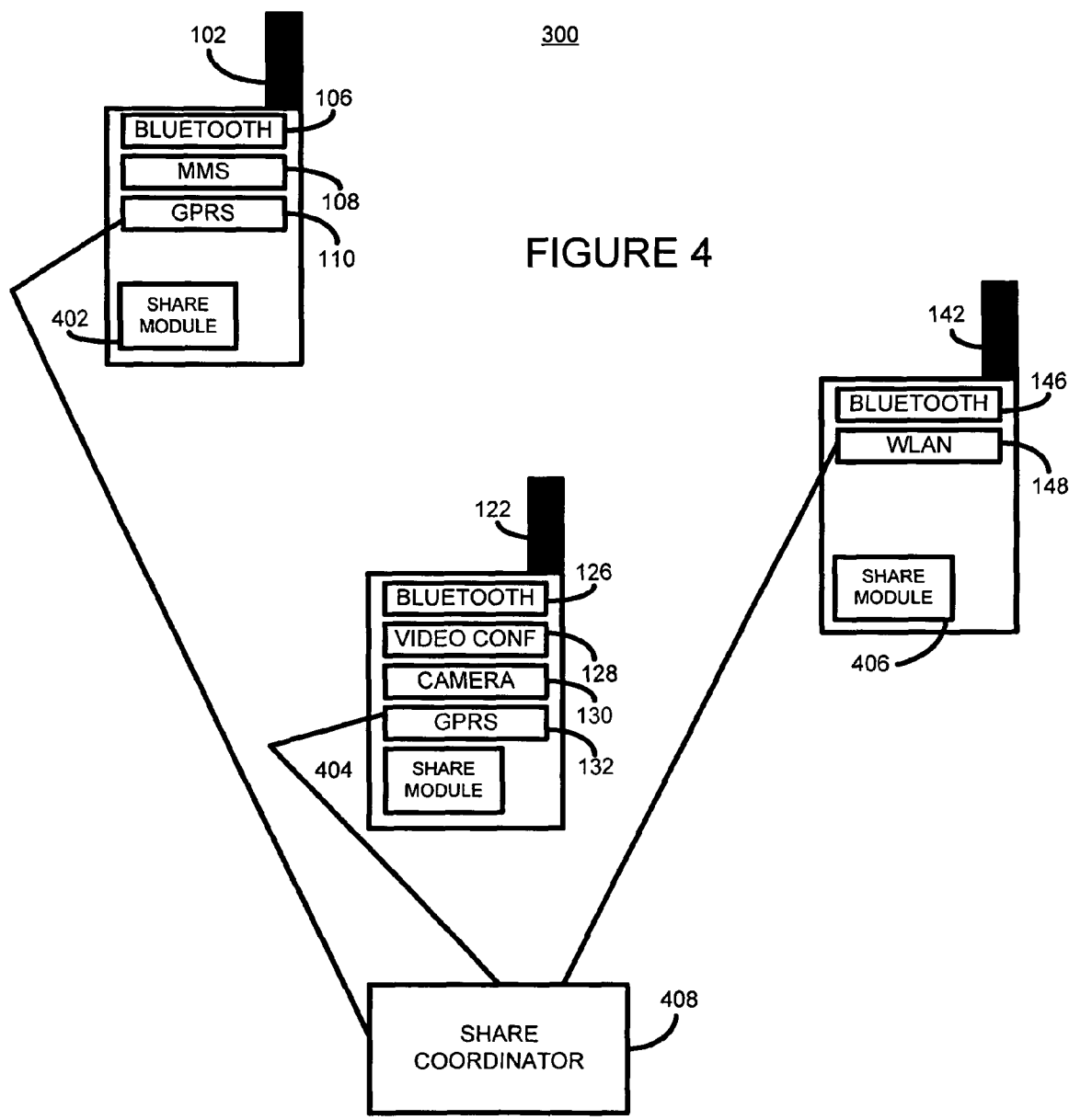
FIG. 4 is a block diagram showing an overview of a system 400 according to a second embodiment of the present invention.

Referring now to FIG. 4 a system 400 according to a second embodiment is shown. FIG. 4 shows the mobile telephones 102, 122 and 142 of FIG. 1, with like references indicating like elements. Each of the mobile telephone 102, 122 and 142 include modified share modules 402, 404 and 406 respectively, and the mobile telephone 122 additionally includes a GPRS module 132. Furthermore, a network-based share coordinator module 408 is provided.

Whereas in the first embodiment each of the mobile telephones 102, 122 and 142 uses Bluetooth to locally discover the available sharable features of each other, the present embodiment uses a network-based share coordinator 408 to facilitate the use of available sharable features on other mobile telephones, as described with additional reference to FIG. 5.

Mobile telephone 102, for example, provides or publishes (step 502) information on its available sharable features by establishing a connection, such as an Internet protocol (IP) connection with the share coordinator 408 using the GPRS module 110. The share coordinator 408 stores details of the available sharable devices in a suitable storage device. The mobile telephone 102 also obtains (step 504) details of any sharable features available on any other mobile telephones or suitable devices from the share coordinator 408.

Mobile telephone 122 also makes available (step 502) details of its available shareable features to the share coordinator 408 and obtains (step 504) the details of other available features in the same manner, as does the mobile telephone 142 which uses, however, an IP connection established through the WLAN module 148.

In a similar manner to that described above in relation to FIG. 3, when one of the mobile telephones 102, 122 or 142 wishes to make use of an available sharable feature this is achieved through the share module in the manner described above.

When one mobile telephone is required to transfer information to another mobile telephone, such as a text and an audio message for an MMS message, this may be done directly between the two mobile telephones by way of an IP connection—in this case the share coordinator 408 preferably provides the IP address of the mobile telephone offering the sharable feature. Alternatively, the share coordinator 408 may act as an intermediary and the information may be transferred through the share coordinator 408, thereby protecting the IP addresses of each mobile telephone.

One advantage of the system of the second embodiment is that mobile telephones are not restricted to sharing features just between mobile telephones in a local wireless network, meaning that a potentially far greater number of sharable features are available for use. However, in a further embodiment, the share modules 402, 404 and 406 are, in addition to being able to communicate with the network-based share coordinator 408, also able to communicate between themselves using, for example, their respective Bluetooth communications modules, as previously described.

Due to the nature of the system, a user using a sharable feature does not necessarily know the identity or location of the mobile telephone on which that feature is being used.

In a further embodiment the share module of each mobile telephone, through their respective user interfaces, presents to the user a list of one or more services. A service requires the use of one more features in order for the service to be provided. However, a service may be proposed on a mobile telephone even though that mobile telephone does not provide one or more of the required features. A service may be preconfigured on the mobile telephone 102 or may be user or network configured, as appropriate. For example, the mobile telephone 142 could be configured to offer an MMS service, even though it has neither a digital camera nor a GPRS module. However, the service is configured with knowledge of the features required to implement the service.

By way of a further example, a service "Send video clip to addressee" may be offered. Such a service may, for example, allow a user to send a video clip residing at a known URI to be sent as an MMS message to another user. On selecting the service, the share module 406, having been previously configured, requests the URI of the video clip and a destination telephone number to which the video clip is to be sent.

The share module 406 is configured to know the features required to implement such a service are a GPRS module and an MMS module and the share module 140 manages the gathering of data and other information and further manages the use of the required shared features in order to provide the service. For example, a video clip may be downloaded through the GPRS module 110 of the mobile telephone 122, and be sent to the addresses as an MMS message using the MMS module 108 of the mobile telephone 102.

The way in which the service is provided to the user is preferably transparent to the user, so the user does not need to be aware of which mobile telephones are providing which features of the service.

The share module may be configured to offer multiple services, and may be arranged to display only those services which are currently available to the user. A service is available when all of the features or functionality required to implement that service are available either through the share module or share coordinator. For example, if a service requires a sharable MMS module and a sharable GPRS module, the service may only be offered to the user when the required sharable features are currently available either locally or via the network share coordinator.

However, in an alternative embodiment, the service may be proposed to a user when only some of the features required for that service are available. For example, if some of the features required to create an MMS message are available, such as a digital camera, sound recorder, etc, the user is allowed to create the message, even though no suitable GPRS or data network feature is available for sending the message. In this case, the share module preferably holds the created message until such a time that the required missing feature is available. When the missing feature is available the service can be completed appropriately.

In a yet further embodiment the owner of a mobile telephone may charge for the use made of shared feature which resides on his mobile telephone, and the price for use of that feature may be additionally communicated to each share module or the share coordinator 408. The user interface preferably displays any such charging information to the user. The charging may be applicable on a per use charge or by using a billing rate applicable for the duration of the use.

For example, if the owner of the mobile telephone 142 sends an MMS message using the MMS module 108 of mobile telephone 102 the share coordinator 408 may cause a debiting of the account balance of the user of the mobile telephone 142 and cause a crediting of the account balance of the user of the mobile telephone 102. The account balances could be either the account balances maintained by the network operators for each of the mobile telephones 102, 122 and 142, or could alternatively be a separate feature sharing account managed by the share coordinator 408.

In this way, a user having a pre-pay account with an outstanding balance about to time-expire may be able to 'sell off' some of that balance at a lower price than is charged by his network operator. In this way, the user may minimise the amount of credit lost at expiration, and at the same time may be credited for use made of that credit and a price set by the user.

In a similar manner, the user of the mobile telephone 142 may have a subscription with his mobile telephone operator where he is charged at 0.10 Euros per minute to make national calls, whereas the user of the mobile telephone 102 may have a subscription with his mobile telephone operator where he is charged at 0.30 Euros to make national calls. The user of the mobile telephone 142 could then share the call making feature of his mobile telephone 142 and sell call minutes at a higher price. Thus, through their respective share modules the user of the mobile telephone 102 can make use of the cheaper calls offered by the user of the mobile telephone 142. For example, the mobile telephone 142 could establish a call, and the voice signals be transmitted directly between the Bluetooth module 106 of the mobile telephone 102.

Where sharing takes places over a local wireless connection, for example as described above with reference to FIG. 1, the share module of each mobile telephone may implement a credit or 'counter' scheme as a billing mechanism. For example, if each of the mobile telephones 102, 122 and 142 each belong to members of a trusted group, such as a group of friends, the share module of each mobile telephone may offer each mobile telephone a number of counter credits. When a mobile telephone uses a shared feature the number of counter credits is reduced until, when no more counter credits are available, sharing is suspended. A mobile telephone which allows use of shared feature, however, is credited with counter credits whenever a feature is shared. In this way, a local community may be established in which members may 'trade' in shareable features and services in a coordinated manner.

When shared features are being used it may be desirable to use encryption to ensure that any data transferred between two mobile telephones is secure. In this way, the owner of a mobile telephone which enables sharing of an MMS module would not be able to access any data relating to the user. Those skilled in the art will appreciate that numerous suitable encryption and security techniques could be used.

Those skilled in the art will also appreciate that Bluetooth is just one example of a short-range radio communications protocol, and that the invention is in no way limited thereto.

References herein to mobile telephones are not limited thereto, and those skilled in the art will understand that other equivalent computing or communication devices could be substituted in place thereof, with appropriate modifications where required.

The invention claimed is:

1. A mobile telephone configured to use a feature of another mobile telephone, the mobile telephones each comprising:
    a share module for allowing access between the mobile telephones to share selected features on the mobile telephones via the share modules, if a user of an other mobile telephone is a selected trusted party of a user of one of the mobile telephones and the selected features are not available on the other mobile telephone, for obtaining details of one of the selected features on one of the mobile telephones which are available for use by the other mobile telephone;
    a user interface for selecting an available feature from a list of the one or more features;
    a network-based share coordinator configured as an intermediary between the mobile telephones, the share coordinator protecting respective addresses of each of the mobile telephones; and
    a communication module for communicating data between the mobile telephones to enable the selected feature to be used on the one of the mobile telephones by the user of the other mobile telephone without transferring the feature to the other mobile telephone.

2. The mobile telephones of claim 1, wherein the share modules are adapted for providing one or more features on one mobile telephone which are available for use by the other mobile telephone.

3. The mobile telephones of claim 1, wherein the share modules are further adapted to obtain, for each available feature, usage information indicating the how to use that feature.

4. The mobile telephones of claim 3, wherein the communication module of one mobile telephone is arranged to communicate data with the other mobile telephone in accordance with the obtained usage information relating to the selected feature.

5. The mobile telephones of claim 1, wherein the communication module of one mobile telephone is arranged to communicate with the other mobile telephone over a local wireless communication link, and further wherein the share module of one mobile telephone is arranged to obtain the details over the local wireless communication link.

6. The mobile telephones of claim 1, wherein the user interfaces are adapted to offer a service, the service requiring one or more functions at least one of which is not available on one mobile telephone, the share modules being arranged to determine when the required features are available on one mobile telephone, and to enable use of the service on the other mobile telephone when it is determined that the required features are available on the one mobile telephone, and wherein the service is not offered unless all of the required features are available.

7. The mobile telephones of claim 1, wherein the share modules are arranged to charge the other mobile telephone for use made of a feature on the one mobile telephone.

8. The mobile telephones of claim 7, further comprising a counter tracking a predetermined number of credits for sharing features with the other mobile telephones, wherein sharing is suspended when the counter expires.

9. The mobile telephones of claim 1, wherein the share modules are arranged to obtain pricing information relating to the one or more features and to display such information to the user.

10. The mobile telephones of claim 1, wherein the mobile telephones do not know the identity and location of the other mobile telephone on which the selected feature is being used.

11. The mobile telephones of claim 1, wherein the selected feature is provided transparently to the user such that the selected feature appears to the user to be available directly on the user's mobile telephone without appearing to the user as a shared feature.

12. A method of using, from a first mobile telephone, a sharable service comprising at least one feature available on a second mobile telephone, the method comprising:

allowing access by a share module of the first mobile telephone to the shareable service on the second mobile telephone via a share module of the second mobile telephone, the shareable service not available on the first mobile telephone, if a user of the first mobile telephone is a selected trusted party of a user of the second mobile telephone;

obtaining details of the sharable service on the second mobile telephone which are available for use by the first mobile telephone;

providing a list of the one or more sharable service even if only a portion of the sharable service is available;

selecting an available service from the list; and receiving input for the sharable service even if all features for the sharable service are unavailable, until such time as all features for the sharable service become available, and at such time, then executing the sharable service using the received input;

communicating data between mobile telephones to enable the first mobile telephone to use the selected service on the second mobile telephone without transferring the service to the first mobile telephone.

13. The mobile telephones of claim 1, wherein the selected feature comprises multimedia message service (MMS) capability.

14. The mobile telephones of claim 1, wherein the selected feature comprises video conferencing.

15. The method of claim 12, further comprising protecting identities of the first and second mobile telephones from each other.

16. The method of claim 12, further comprising transparently providing the selected service on the first mobile telephone, such that the selected service appears on the first mobile telephone as though the selected service is directly available on the first mobile telephone.

17. The method of claim 12, further comprising tracking a predetermined number of credits for accessing the sharable features, wherein accessing the sharable features is suspended when the credits expire.

* * * * *

UNITED STATES PATENT AND TRADEMARK OFFICE
CERTIFICATE OF CORRECTION

PATENT NO. : 7,949,332 B2
APPLICATION NO. : 11/491842
DATED : May 24, 2011
INVENTOR(S) : Xavier Peuziat et al.

It is certified that error appears in the above-identified patent and that said Letters Patent is hereby corrected as shown below:

In column 8, line 40, in Claim 3, after "indicating" delete "the".

Signed and Sealed this
Thirteenth Day of December, 2011

David J. Kappos
*Director of the United States Patent and Trademark Office*